United States Patent [19]

Bruch et al.

[11] Patent Number: 4,938,559
[45] Date of Patent: Jul. 3, 1990

[54] SWITCH FOR FIBER-OPTICAL WAVEGUIDES

[75] Inventors: Helmut Bruch; Bertold Malorny, both of Berlin, Fed. Rep. of Germany

[73] Assignee: Siemens Aktiengesellschaft, Berlin and Munich, both of Fed. Rep. of Germany

[21] Appl. No.: 706,233

[22] Filed: Feb. 27, 1985

Related U.S. Application Data

[63] Continuation of Ser. No. 416,331, Sep. 9, 1982, abandoned.

[30] Foreign Application Priority Data

Sep. 29, 1981 [DE] Fed. Rep. of Germany ....... 3138686

[51] Int. Cl.[5] ................................. G02B 6/36
[52] U.S. Cl. ............................. 350/96.20; 350/96.21; 350/96.16
[58] Field of Search ............... 350/96.10, 96.15, 96.16, 350/96.20, 96.21, 96.22

[56] References Cited

U.S. PATENT DOCUMENTS

| | | | |
|---|---|---|---|
| 4,152,043 | 5/1979 | Albanese | 350/96.20 |
| 4,189,206 | 2/1980 | Terai et al. | 350/96.20 |
| 4,318,587 | 3/1982 | Grassl | 350/96.20 |
| 4,452,507 | 6/1984 | Winzer | 350/96.20 |
| 4,514,034 | 4/1985 | Bruch | 350/96.20 |
| 4,652,081 | 3/1987 | Fatatry | 350/96.20 |
| 4,653,849 | 3/1987 | Boirat et al. | 350/96.22 |
| 4,653,850 | 3/1987 | Boirat et al. | 350/96.22 |
| 4,759,597 | 7/1988 | Lemonde | 350/96.20 |
| 4,807,949 | 2/1989 | Jacobi et al. | 350/96.20 |
| 4,834,488 | 5/1989 | Lee | 350/96.20 |

FOREIGN PATENT DOCUMENTS

| | | | |
|---|---|---|---|
| 2903867 | 8/1980 | Fed. Rep. of Germany | 350/96.20 |
| 55-156903 | 12/1980 | Japan | 350/96.20 |
| 1426475 | 2/1976 | United Kingdom | 350/96.20 |

OTHER PUBLICATIONS

Rawson et al., "A Fiber Relay . . . Repeaters", Optical Engineering, vol. 19, No. 4, Jul./Aug. 1980, pp. 628–630.
Comerford, "Fiber-Optic . . . Switch", IBM Tech. Disclosure, vol. 21, No. 10, 3/79, pp. 4280–4281.

Primary Examiner—William L. Sikes
Assistant Examiner—Brian M. Healy
Attorney, Agent, or Firm—Hill, Van Santen, Steadman & Simpson

[57] ABSTRACT

A switch for opening and closing optical connections between at least a pair of fiber-optical waveguides comprising a base body having a planar seating surface, a common retaining element being formed of a spring steel resting on the seating surface of the base body and having at least one slot to form a switch tongue integrally connected by at least one stay to a carrier part, at least two waveguides being secured on the same surface of the retaining elements so that when the tongue is in a first position engaging the seating surface, a closed optical connection between the waveguides will be obtained. Preferably, the switch is electromagnetically actuated to cause the tongue to move between a pair of positions with one position having the waveguides optically connected together and the other position having them out of connection. In one embodiment, waveguides are disposed on both surfaces of the retaining element so that the two pairs of waveguides are optically connected in one position and a bridging circuit between one waveguide of one pair and another waveguide of the other pair is obtained in the second position.

15 Claims, 2 Drawing Sheets

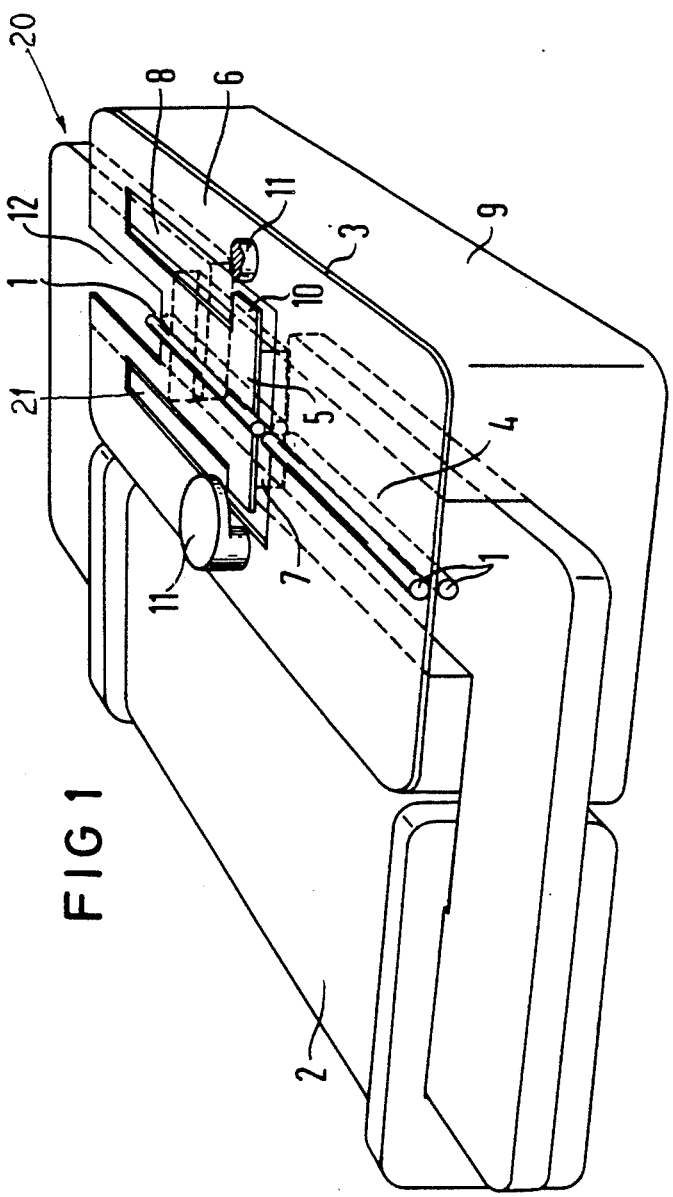
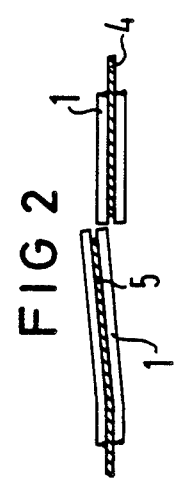
FIG 1
FIG 2

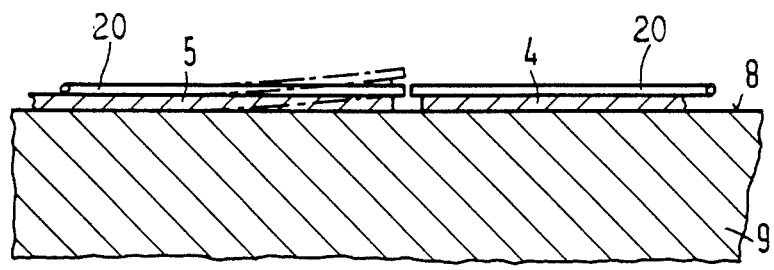

SWITCH FOR FIBER-OPTICAL WAVEGUIDES

This is a continuation of application Ser. No. 416,331, filed Sept. 9, 1982 now abandoned.

BACKGROUND OF THE INVENTION

The present invention is directed to a switch for opening and closing an optical connection between two fiber-optical waveguides which are essentially aligned with one another when in the closed position.

A switch for fiber-optical waveguides has been disclosed by German OS 2,903,867. In this publication, a stationary fiber-optical waveguide end is mounted on a carrier part, which is secured in a switch body. A movable fiber-optical waveguide is secured to a shiftable switch tongue, which is also mounted in the body and has a free end adjacent the end of the stationary fiber-optical waveguide that is movable thereto. In a closed switch condition, the two fiber-optical waveguides are opposite one another in a precise alignment and the tongue can be switched by an application of a magnetic field to a position with the two fibers out of alignment to open the connection therebetween. In order to produce such a switch, rather involved methods are required for obtaining the lateral guidance of the fiber-optical waveguides as well as for matching the position of the waveguides during the movement between positions.

SUMMARY OF THE INVENTION

The present invention is directed to creating a switch for opening and closing an optical connection between a pair of precisely aligned fiber-optical waveguides which switch is simpler in construction and can be produced in a more cost-favorable manner.

To accomplish these objects, the switch comprises a base body having a planar seating surface, a common retaining element being formed of a spring steel resting on the planar seating surface of the base body, said common retaining element having at least one slot therein to form a switch tongue integrally connected by at least one stay to a carrier part, at least one waveguide secured on a surface of the carrier part, a second waveguide secured to a surface of the switch tongue in axial alignment with the first waveguide with the end faces of the two waveguides being spaced apart when the tongue is in a first position pressed against the seating surface to close the optical connection, said tongue being movable to a second position with the second waveguide out of optical connection with the first waveguide and means for moving the tongue to one of said first and second positions.

Since the switch tongue and the carrier part are united in a common retaining element, it has become possible to secure both the fiber-optical waveguides to the retaining element in one work step. These waveguides can be precisely aligned relative to one another in an axial device with a through, lateral seating edge for the fiber-optical waveguides and can be secured in this position to the retaining element for example by means of gluing.

After the adhesive or glue has hardened, the fiber-optical waveguides are precisely laterally aligned relative to one another. Thus, their position and orientation on the retaining element plays only a subordinate role. An alignment of the switch tongue and the carrier part relative to one another is no longer necessary. The switch tongue which is stamped, for example, from spring steel of the retaining element rest together with the carrier part against a shared planar seating surface of the base body in the closed switch position. When the fiber-optical waveguides are disposed in the same side or surface of the retaining element, then the two fiber-optical waveguides are also precisely aligned relative to one another. When the fiber-optical waveguides are situated on the side of the retaining element which faces away from the base body, then this likewise applies since the material thickness of the carrier part and of the switch tongue are practically identical in this area because of their small spacing. Fluctuations of a few hundredths of a millimeter already have a great attenuating effect in the coupling of two fiber-optical waveguide ends. When the carrier part and the switch tongue are formed of two separate elements, differences in the thickness of the roll material would cause fluctuations which could hardly be avoided and which fluctuations would cause a greater attenuating effect of the closed connection.

In a preferred embodiment, the slots in the retaining element have a U-shaped configuration and preferably a configuration which provides laterally extending tab-like projections on the switch tongue adjacent the free end thereof. These tab-like projections will rest on the planar seating surface and preferably the switch includes a stop for engaging each projection when the switch tongue is in the second position. Since it is desirable to move the switch tongue between the two positions by applying a magnetic field and it is also desirable that the retaining element does not have a magnetic flux formed therein, the element is preferably of a non-magnetizable material and the tongue has at least one magnetizable armature part secured thereto.

Another embodiment of the invention utilizes four waveguides with a third waveguide being disposed on a surface of the carrier part which is opposite the one surface having the first waveguide and the two waveguides being aligned to be one another the other and separated by the carrier part, a fourth waveguide is provided on the surface of the tongue opposite the surface carrying the second waveguide and is aligned therewith so that the two waveguides lie above one another and are separated by the tongue. In this arrangement, the position of the stops relative to the seating surface are at a distance which is equal to the axial spacing between a pair of waveguides such as the first and third waveguides on the carrier part so that when the tongue is in the first position, the first and second waveguides are coupled together and the third and fourth waveguides are coupled together. However, when the tongue moves to the second position, the second waveguide is coupled to the third waveguide and the first and fourth waveguides are not coupled to another waveguide.

It should be noted that the forming of the slots in the retaining element to form the tongue can be easily accomplished utilizing stamping technology.

If one were to manufacture the retaining element of a magnetizable material, then a relatively strong magnetic sub-flux would occur along the stays which interconnect the base of the switch tongue to the carrier part. The presence of this sub-flux is prevented by constructing the retaining element out of a non-magnetizable material which is also a spring steel so that the magnetic flux strength of the switch can be kept low. By means of designing the switch tongue with the laterally extending tab-like projections, it is possible to secure the narrow armature part to the tip of the switch tongue where it has the greatest effect. The lateral tabs or projections engage the seating surface of the base with the level of the free end of the switch tongue being the same as the carrier part.

As a result of providing the third and fourth waveguides as mentioned hereinabove, a bridge circuit can be realized. With the switch tongue lifting off of the seating surface of the base body, the fiber-optical waveguide facing the base body is aligned with its end on the switch tongue precisely towards the fiber-optical waveguide on the carrier part facing away from the base body. The same material thickness of the carrier part and switch tongue is of considerable advantage particularly given this additional design consideration. It is particularly advantageous in the manufacture of switches that all four fiber-optical waveguides can be simultaneously secured to the retaining element. This can be obtained, for example, by the element being plugged into a precisely matched acception slot of an auxiliary device whose upper sides proceed precisely perpendicular relative to the slot, Then the four fiber-optical waveguide ends are now pressed into the inside corner between the retaining element and the surface and all four fiber-optical waveguides are precisely laterally aligned relative to one another. If the switch tongue and carrier part are separate then a considerable additional cost is required for the lateral alignment of the tongue and carrier part during the assembly of the switch.

BRIEF DESCRIPTION OF THE DRAWINGS

FIG. 1 is a perspective view of a switch in accordance with the present invention;

FIG. 2 is a cross-sectional view taken along the axis of the optical fibers of the switch of FIG. 1 with portions in elevation for purposes of illustration; and FIG. 3 is a partial cross-sectional view taken along the axis of the optical fiber with portions in elevation for purposes of illustration of an embodiment of the switch of FIG. 1 containing only one pair of fiber-optical waveguides.

DESCRIPTION OF THE PREFERRED EMBODIMENTS

The principles of the present invention are particularly useful in a switch generally indicated at 20 in FIG. 1 for fiber-optical waveguides which can be actuated by means of electromagnet 2. The switch 20 has a pair of fiber-optical waveguides 1 which are disposed on both sides or surfaces of a retaining element 3 which consists of a non-magnetizable spring steel. The retaining element 3 has slot 21 which is illustrated as a U-shaped configuration that forms a deflectable switch tongue 5 which is integrally connected to a carrier part 4 by integral connecting stays 6. To enable a magnetic attraction of the switch tongue 5 to a first position, a magnetizable armature part 7 is secured to the switch tongue 5. The armature part 7 is provided with a groove which is not visible but loosely receives or surrounds one of the fiber-optical waveguides 1. As illustrated, the retaining element 3 is mounted on a polished planar seating surface 8 of a base body 9 of the switch 20. As also illustrated in FIG. 1, the U-shaped groove 21 has a configuration so that the tongue 5 adjacent the free end has tab-like projections 10 that extend laterally to the axis of the waveguides and engage the seating surface 8 when the tongue is in a first position with its surfaces lying in the same plane as the surfaces of the retaining part 4.

The fiber-optical waveguides 1 are disposed on both sides or surfaces of the retaining element 3. In the illustrated position, two transversely deflectable fiber-optical waveguides 1 which are secured to the switch tongue 5 are precisely aligned relative to the fiber-optical waveguides 1 which are stationarily disposed on the carrier part 4. As illustrated, each of the pairs of waveguides are disposed one above the other and separated by the thickness of the tongue and carrier part 4, respectively. It is also noted that the spacing above one another is along the switching direction along which the tongue will move. To limit the movement of the tongue to the other or second switch position, a pair of stops 11 are connected to the base body 9 and engage the tabs 10. The tab of the switch tongue 5 is dimensioned in such a manner that in one or a first position, the fiber-optical waveguides on the switch tongue 5 face the two fiber-optical waveguides on the two stationary fiber-optical waveguides on the carrier plate with the tabs engaged on the seating surface 8. When the electromagnet is deenergized, the tongue 5 will shift to the second position, which is best illustrated in FIG. 2, due to the spring force. While in the second position, the waveguide on the tongue 5 which faces the base body 9 will be axially aligned with the waveguide on the carrier part 4 that faces away from the body. Thus, the position of the stops 11 from the seating surface 8 is selected to be equal to the axial spacing between the two fibers attached to the tongue 5.

In the area of the base of the tongue 5, the element 3 is provided with a recess 12 which is centered on the fibers 1 and reduce the cross-section of the section. This reduction in the cross-section improves the elasticity of the switch tongue 5. Thus, the switch tongue can be kept shorter and as a result of the recess the stiffness in the lateral direction is increased.

In the embodiment of FIG. 3, the switch has only two optical waveguides or fibers 20, one of the two fibers 20 is mounted in an upper surface of the carrier part 4 and the other is mounted on an upper surface of the tongue 5 and in alignment with the fibers 20 on the part 4. The one-piece sheet or, retaining element is mounted on the surface 8 of the base body 9 so that the surface 8 forms a stop surface or stop means for determining a position with the fibers 20 being in alignment. When the tongue 5 is moved away from the surface 8, the ends of the fibers 20 are moved out of alignment as illustrated in broken lines.

Although various minor modifications may be suggested by those versed in the art, it should be understood that we wish to embody within the scope of the patent granted hereon, all such modifications as reasonably and properly come within the scope of our contribution to the art.

We claim:

1. A switch for opening and closing an optical connection between a pair of fiber-optical waveguides with one of the waveguides being held on a stationary carrier part and the other waveguide being transversely movable from a position optically connected to the one waveguide to a position disconnected therefrom, said switch comprising a base body having a planar seating surface forming a stop surface, a one-piece sheet of spring material being mounted on the base body with one surface of the sheet resting on the planar seating surface of the base body, said one-piece sheet having at least one slot to form a carrier part, a switch tongue and at least one stay extending between a base of the tongue and the carrier part, at least one waveguide secured on a surface of the carrier part, a second waveguide secured to a surface of the switch tongue in axial alignment with the first waveguide with the end faces of the two waveguides being spaced apart when the tongue is in a first position pressed against the seating surface to close the optical connection, said tongue being movable to a second position with the second waveguide out of the optical connection with the first waveguide and means for moving the tongue to one of said first and second positions including an electromagnet mounted on the base body.

2. A switch according to claim 1, wherein said slot has a U shape and the base of said tongue is connected to the carrier part by a pair of stays.

3. A switch according to claim 1, wherein the one-piece sheet consists of a non-magnetizable material and said switch includes at least one magnetizable armature part being attached to the switch tongue.

4. A switch according to claim 3, wherein the slots in the one-piece sheet have a configuration to form laterally extending tab-like projections on the switch tongue adjacent a free end thereof, said tab-like projections resting against the stop surface of the planar seating surface when said tongue is in the first position and said switch includes a stop engaging each projection when the switch tongue is in said second position.

5. A switch according to claim 4, which includes a third waveguide disposed on the surface of the carrier part opposite the surface carrying the first waveguide and aligned with the first waveguide, a fourth waveguide provided on the surface of the tongue opposite the surface carrying the second waveguide and aligned therewith, and wherein said stops are positioned relative to the stop surface of the seating surface by a distance equal to the axial spacing of the waveguides on the carrier part.

6. A switch according to claim 3, which includes a third waveguide secured on the surface of the carrier part opposite the surface containing the first waveguide so that the first and second waveguides are separated by said part, a fourth waveguide being secured on a surface of the tongue opposite the second waveguide so that the second and fourth waveguides are separated by said tongue, said second and fourth waveguides extending parallel and being aligned one above the other and said first and third waveguides being parallel to each other and aligned one above the other, said tongue being movable a distance between said first and second positions equal to the axial spacing between the first and third waveguides.

7. A switch according to claim 1, which includes a third waveguide being mounted on a surface of the carrier part opposite to the first waveguide and being aligned parallel and vertical thereto, a fourth waveguide being mounted on a surface of the tongue opposite the surface containing the second waveguide to be parallel and aligned above each other, said tongue moving a distance from a first position engaging the seating surface to a second position equal to the distance between the axes of first and third waveguides.

8. A switch according to claim 1, wherein the slots form a U-shaped configuration with the base of the tongue being connected to the carrier part by a pair of parallel extending stays, said one-piece sheet consisting of a non-magnetizable material and said switch includes at least one magnetizable armature part being attached to the switch tongue.

9. A switch according to claim 8, wherein said U-shaped slots form tab-like projections adjacent the free end of said tongue, said projections resting on the stop surface of the planar seating surface of the body while in the first position, and said body having stops spaced from said seating surface for engaging said projections as the tongue moves to the second position.

10. A switch according to claim 9, wherein a third waveguide is disposed on a surface of the carrier part opposite the first waveguide and extends parallel thereto with the part separating said first and third waveguides, a fourth waveguide being mounted on the tongue parallel to the second waveguide with the tongue extending between the two waveguides, and wherein the distance between said stops and said seating surface is equal to the axial spacing between the first and third waveguides.

11. In a switch for opening and closing an optical connection between a pair of fiber-optical waveguides with at least a first waveguide being secured on a surface of a stationary carrier part, a second waveguide being secured to a surface of a switch tongue in axial alignment with the first waveguide with the end faces of the two waveguides being spaced apart when the tongue is in a first position to close the optical connection, said tongue being movable to a second position with the second waveguide out of the optical connection with the first waveguide, said switch having a common base body and means for moving the tongue to one of said first and second positions, the improvement comprising the base body having a planar seating surface forming a stop surface, and a one-piece sheet of spring material being mounted on the base body with one surface resting on the planar seating surface of the base body, said one-piece sheet having at least one slot extending around a part of the tongue to subdivide the sheet into the carrier part, the switch tongue, and at least one connecting stay extending between a base of the switch tongue and the carrier part to form a common retaining element and both the first and second waveguides being arranged on the same surface of the one-piece sheet so that when the tongue is in the first position, both the one surface of the tongue and the carrier part are in the same plane and engage the planar seating surface of the base body.

12. In a switch according to claim 11, wherein said slot has a U shape and the base of said tongue is connected to the carrier part by a pair of stays.

13. In a switch according to claim 11, wherein the slot in the retaining element has a configuration to form at least one laterally extending tab-like projection on the switch tongue adjacent a free end thereof, said tab-like projection resting against the stop surface of the planar seating surface when said tongue is in the first position and said switch includes a stop engaging the projection when the switch tongue is in said second position.

14. A switch according to claim 13, which includes a third waveguide disposed on the surface of the carrier part opposite the surface carrying the first waveguide and aligned with the first waveguide, a fourth waveguide provided on the surface of the tongue opposite the surface carrying the second waveguide and aligned therewith, and wherein said stop is positioned relative to the stop surface by a distance equal to the axial spacing of the waveguides on the carrier part.

15. In a switch according to claim 14, wherein said slot has a U shape and the base of the tongue is connected to the carrier part by a pair of stays.

* * * * *